US011858162B2

(12) United States Patent
Barber et al.

(10) Patent No.: US 11,858,162 B2
(45) Date of Patent: Jan. 2, 2024

(54) IMPELLERS FOR CUTTING MACHINES AND CUTTING MACHINES EQUIPPED WITH IMPELLERS

(71) Applicant: Frito-Lay North America, Inc., Plano, TX (US)

(72) Inventors: Keith A. Barber, Frisco, TX (US); Rebecca G. Gann, McKinney, TX (US); Betsy M. Hicks, Carrollton, TX (US)

(73) Assignee: Frito-Lay North America, Inc., Plano, TX (US)

( * ) Notice: Subject to any disclaimer, the term of this patent is extended or adjusted under 35 U.S.C. 154(b) by 0 days.

(21) Appl. No.: 17/370,270

(22) Filed: Jul. 8, 2021

(65) Prior Publication Data

US 2023/0012222 A1 Jan. 12, 2023

(51) Int. Cl.
*B26D 7/26* (2006.01)
*B26D 1/00* (2006.01)

(52) U.S. Cl.
CPC ......... *B26D 7/2614* (2013.01); *B26D 1/0006* (2013.01); *B26D 2001/006* (2013.01); *B26D 2210/02* (2013.01)

(58) Field of Classification Search
CPC ................ B26D 7/2614; B26D 1/0006; B26D 2001/006; B26D 2210/02; B26D 1/03; B26D 7/0691
See application file for complete search history.

(56) References Cited

U.S. PATENT DOCUMENTS

| | | | | | |
|---|---|---|---|---|---|
| 2,195,879 A | * | 4/1940 | Urschel | B26D 1/03 83/403 |
| 3,139,128 A | | 6/1964 | Urschel et al. | |
| 3,139,129 A | | 6/1964 | Urschel et al. | |
| 4,523,503 A | * | 6/1985 | Julian | B26D 1/36 83/404.3 |
| 5,694,824 A | * | 12/1997 | Jacko | B26D 7/2614 83/858 |
| 5,819,628 A | * | 10/1998 | Cogan | B23D 35/008 83/404.3 |

(Continued)

FOREIGN PATENT DOCUMENTS

| | | |
|---|---|---|
| JP | 2006509507 | 3/2006 |
| KR | 2014-0063882 | 5/2014 |

(Continued)

OTHER PUBLICATIONS

International Search Report and Written Opinion issued in PCT/US2022/033272 dated Oct. 17, 2022.

(Continued)

*Primary Examiner* — Jonathan G Riley
(74) *Attorney, Agent, or Firm* — Barnes & Thornburg LLP; G. Peter Nichols

(57) ABSTRACT

Machines for cutting products and impellers suitable for use with the machines. The impellers include a lower plate having a central zone and paddles configured with the lower plate outside of the central zone to direct material to the cutting head. At least a first exit slot is located in the lower plate, intersecting the perimeter of the lower plate, and extending through the lower plate to define a passageway to enable foreign debris at the upper surface to exit the impeller through the passageway.

20 Claims, 15 Drawing Sheets

(56) References Cited

U.S. PATENT DOCUMENTS

| | | | | |
|---|---|---|---|---|
| 6,968,765 | B2 | 11/2005 | King | |
| 7,658,133 | B2 * | 2/2010 | Jacko | B26D 1/03 83/858 |
| 8,161,856 | B2 | 4/2012 | Jacko et al. | |
| 9,193,086 | B2 | 11/2015 | Jacko et al. | |
| 10,265,877 | B2 | 4/2019 | Bucks | |
| 10,456,943 | B2 | 10/2019 | King et al. | |
| 2007/0240550 | A1 * | 10/2007 | Jacko | B26D 1/36 83/403 |
| 2008/0022822 | A1 * | 1/2008 | Jacko | B26D 7/0691 83/403 |
| 2016/0361831 | A1 | 12/2016 | Fant | |
| 2019/0099910 | A1 | 4/2019 | Bucks | |
| 2022/0126475 | A1 * | 4/2022 | Barber | B26D 7/0691 |
| 2022/0258371 | A1 * | 8/2022 | Gereg | B26D 3/26 |

FOREIGN PATENT DOCUMENTS

| | | |
|---|---|---|
| KR | 2017-0092663 | 8/2017 |
| WO | 2007-124039 | 11/2007 |
| WO | 2022174007 | 8/2022 |

OTHER PUBLICATIONS

International Search Report and Written Opinion dated Jul. 20, 2021 for PCT Application No. PCT/US2020/056835.

* cited by examiner

IMPELLERS FOR CUTTING MACHINES AND CUTTING MACHINES EQUIPPED WITH IMPELLERS

BACKGROUND

The present invention generally relates to machines for cutting products, including but not limited to slicing food products. The invention particularly relates to impellers for use with cutting machines.

Various types of equipment are known for slicing, shredding and granulating food products, for example but not limited to, vegetables, fruits, dairy products, and meat products. Widely used machines for this purpose are commercially available from Urschel Laboratories, Inc., and include machines under the name Model CC®. The Model CC® machines are centrifugal-type slicers capable of slicing a wide variety of products at high production capacities. The Model CC® line of machines is particularly adapted to produce uniform slices, strip cuts, shreds, and granulations. Certain configurations and aspects of Model CC® machines are represented in U.S. Pat. Nos. 3,139,128, 3,139,129, 5,694,824, 6,968,765, 7,658,133, 8,161,856, and 9,193,086, and 10,456,943 and U.S. Patent Application Publication No. 2016/0361831, the entire contents of which are incorporated herein by reference.

FIG. 1 schematically represents a cross-sectional view of a machine 10 that is representative of a Model CC® machine. The machine 10 includes a generally annular-shaped cutting head 12 and an impeller 14 coaxially mounted within the cutting head 12. The impeller 14 has an axis 17 of rotation that coincides with the center axis of the cutting head 12, and is rotationally driven about its axis 17 through a shaft (not shown) that is enclosed within a housing 18 and coupled to a gear box 16. The cutting head 12 is mounted on a support ring 15 above the gear box 16 and remains stationary as the impeller 14 rotates. Products are delivered to the cutting head 12 and impeller 14 through a feed hopper 11 located above the impeller 14. In operation, as the hopper 11 delivers products to the impeller 14 generally in the area of the axis 17 toward a central zone of a base or lower plate, centrifugal forces cause the products to move outward into engagement with cutting knives (not shown) that are mounted along the circumference of the cutting head 12. The impeller 14 comprises generally radially oriented paddles 13, each having a face that engages and directs the products against the knives of the cutting head 12 as the impeller 14 rotates. Other aspects pertaining to the construction and operation of Model CC® machines, including various embodiments thereof, can be appreciated from the aforementioned prior patent documents incorporated herein by reference.

FIG. 2 is an isolated view of a particular but non-limiting example of a cutting head 12 that has been used with Model CC® slicing machines, including the machine 10 schematically represented in FIG. 1. The cutting head 12 represented in FIG. 2 will be described hereinafter in reference to the machine 10 of FIG. 1 equipped with an impeller 14 as described in reference to FIG. 1. On the basis of the coaxial arrangement of the cutting head 12 and the impeller 14, relative terms including but not limited to "axial," "circumferential," "radial," etc., and related forms thereof may be used below to describe the cutting head 12 represented in FIG. 2.

In FIG. 2, the cutting head 12 can be seen as generally annular-shaped with cutting knives 20 mounted at its perimeter. FIG. 2 represents the knives 20 as having straight cutting edges for producing flat slices, and as such may be referred to herein as "flat" knives, though the cutting head 12 can use knives of other shapes, for example, "corrugated" knives characterized by a periodic pattern, including but not limited to a sinusoidal shape with peaks and valleys when viewed edgewise, to produce corrugated, strip-cut, shredded and granulated products. Each knife 20 projects radially inward in a direction generally opposite the direction of rotation of the impeller 14 within the cutting head 12, and defines a cutting edge at its radially innermost extremity.

The cutting head 12 further comprises lower and upper support rings 22 and 24 to and between which circumferentially-spaced support segments, referred to herein as shoes 26, are secured with fasteners 36. Each shoe 26 defines a cutting station of the cutting head 12.

The knives 20 of the cutting head 12 are individually secured with clamping assemblies 28 to the shoes 26. Each clamping assembly 28 includes a knife holder 30 mounted to and between the support rings 22 and 24, and a clamp 32 positioned on the radially outward-facing side of the holder 30 to secure a knife 20 thereto. Each knife 20 is supported by a radially outer surface of one of the knife holders 30, and the corresponding clamp 32 overlies the holder 30 so that the knife 20 is between the outer surface of the holder 30 and a radially inward surface of the clamp 32 that faces the holder 30. By forcing the clamp 32 toward the holder 30, the clamp 32 applies a clamping force to the knife 20 adjacent its cutting edge.

FIG. 2 further shows a gate 40 secured to each shoe 26. A food product crosses the gate 40 prior to encountering the knife 20 mounted to the succeeding shoe 26, and together the cutting edge of a knife 20 and a trailing edge of the preceding gate 40 define a gate opening that determines the thickness of a slice produced by the knife 20. While the gate shown in FIG. 2 is removable or replaceable, gates that are integral or formed as part of the shoe are known and can be used with the inventive impeller for cutting machines that will be described below. In addition, it will be appreciated that while the gate 40 shown in FIG. 2 is being finned, it may have any sort of surface such as smooth.

FIG. 3 is an isolated view of a particular but non-limiting example of an impeller 14 that has been used with Model CC® slicing machines, including the machine 10 schematically represented in FIG. 1. FIG. 3 depicts that additional sets of mounting holes 34 may be provided to enable different numbers of paddles 13 to be mounted on the impeller 14 at alternative locations. The placement of the mounting holes 34 may also determine the orientation or pitch of each paddle face relative to a radial of the impeller 13 terminating at the outermost radial extent of the paddle face.

An alternative paddle arrangement is shown in U.S. Pat. No. 10,265,877, which describes a dual-paddle arrangement with an inner paddle and an outer paddle where the inner paddle is located radially inward of the outer paddle. The inner paddle impels the food product to be cut to a size that is small enough so that it slides or moves past the outer radial extent of the inner paddle to the outer paddle where the reduced size food product can be subsequently and further cut. It will be appreciated by those of skill in the art that the inventive impeller described below can be applied to the above-described paddle arrangement as well as any other currently available or later developed paddle arrangements.

While the centrifugal-type Model CC® machines have performed extremely well for their intended purpose, further improvements are continuously desired and sought, including improvements relating to the maintenance of the machines. A non-limiting example is the replacement of the knives 20, whose cutting edges are vulnerable to damage, for example, from impacts with rocks, sand, and other foreign debris that often accompany food products such as potatoes. FIGS. 3 and 4 represent one such approach by equipping the paddles 13 of the impeller 14 with multiple posts 42 located and spaced along their radially outermost extent, forming multiple gaps 44 through which rocks and other foreign debris can pass and, in a best case scenario, may exit the impeller at a location between the gate of a leading shoe and the subsequent knife/holder of the trailing shoe (with the largest opening existing at the lowest part of the shoe). As a result, when a rock or other foreign material is encountered high on the shoe where the exit opening is narrow, the posts 42 inhibit the impeller paddle 13 from forcing the debris through this narrow opening which provides an opportunity for the debris to drop or fall to the lower part of the shoe where the exit hole is larger and damage is less likely to occur.

The posts 42 can be replaceable, such as by being threading into a face at the radially outermost extent of each paddle 13. The uppermost and lowermost extents of the paddles 13 are represented in FIGS. 3 and 4 as lacking a post 42 and instead are shown as having what may be referred to as upper and lower shear edges 46 and 48, which inhibit accumulation of debris at the perimeter of the cutting head. The lower shear edge 48 may also aid in forcing debris through the lower-most, largest exit opening, which is the preferential exit opening for the slicer head.

SUMMARY

The present invention provides, at least in part, machines for cutting products, including but not limited to centrifugal-type slicing machines adapted for slicing food products, and to impellers suitable for use in such machines.

According to one aspect, an impeller is provided that is adapted to be coaxially mounted within a cutting head for rotation about an axis of the cutting head. The impeller includes a lower plate having an upper surface, a lower surface, and a perimeter. Paddles are configured with the lower plate such that, under the influence of centrifugal forces when the impeller is rotated, material on the lower plate may be circumferentially directed in a radially outward direction of the impeller. In one embodiment, at least one of the paddles may have an outer radial extent that is adjacent the perimeter of the lower plate.

Exit slots are located in the lower plate and at least some are is open to the perimeter of the lower plate. The exit slots extend through the lower plate between the upper and lower surfaces of the lower plate to define a passageway connected to the upper surface to enable foreign debris at the upper surface to exit the impeller through the passageway.

Technical aspects of impellers and centrifugal-type cutting machines equipped with impellers as described above preferably include the ability to reduce the likelihood of damage to knives and knife holders of such machines from impacts with rocks and other foreign debris that may accompany a material or product being cut, such as but not limited to, food products such as potatoes.

Other aspects and advantages of this invention will be appreciated from the following detailed description.

BRIEF DESCRIPTION OF THE DRAWINGS

FIG. 9 is a plan view that shows a configuration of exit slots provided on a lower plate for an impeller capable of use in a centrifugal-type slicing machine of the type represented in FIG. 1 and the cutting head shown in FIG. 2.

DETAILED DESCRIPTION OF THE INVENTION

Figure 2:
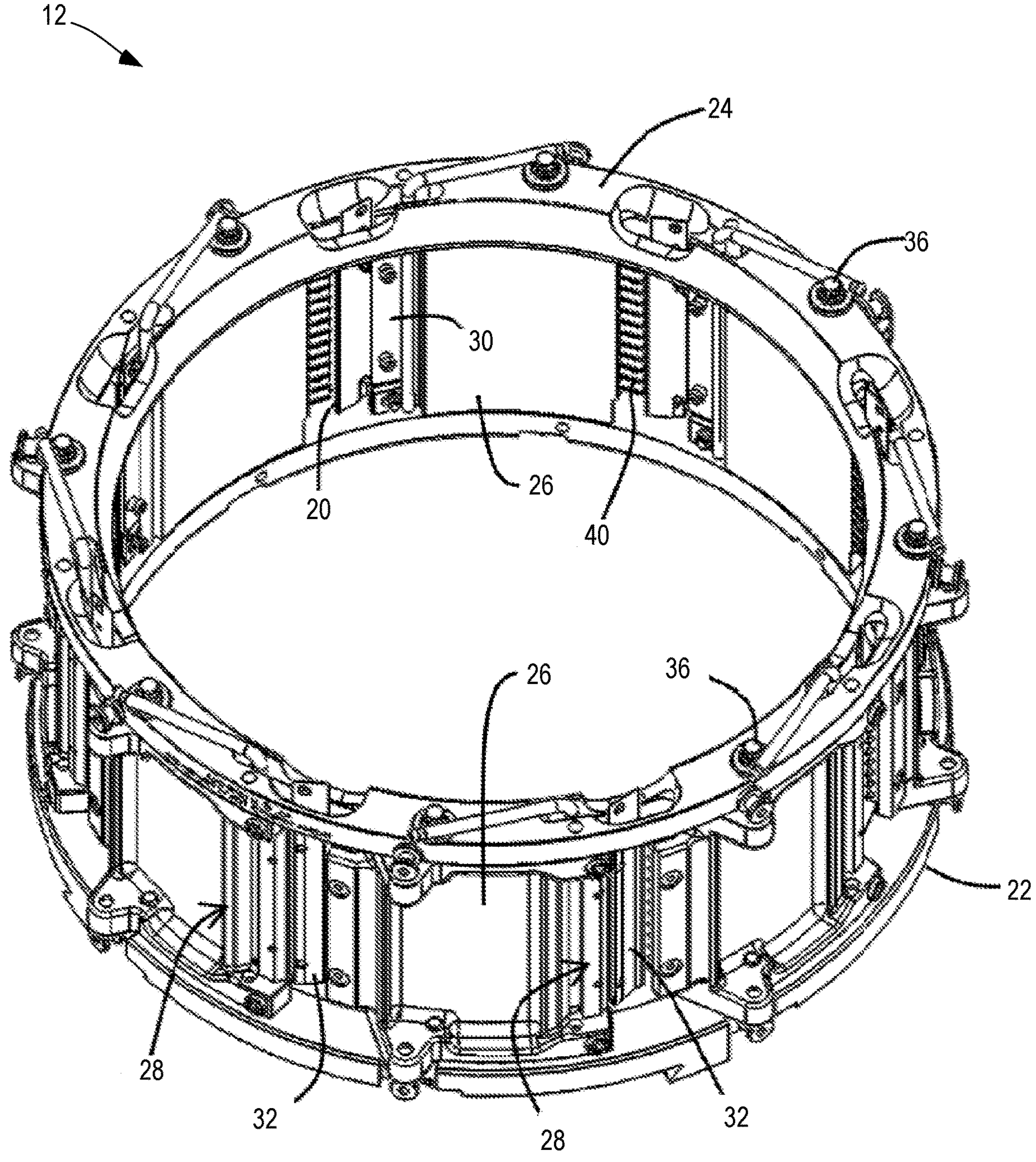
FIG. 2 PRIOR ART
FIG. 2 is a perspective view representing details of a cutting head that has found use in the slicing machine of FIG. 1 and for which the inventive impeller may be used.
Figure 3:
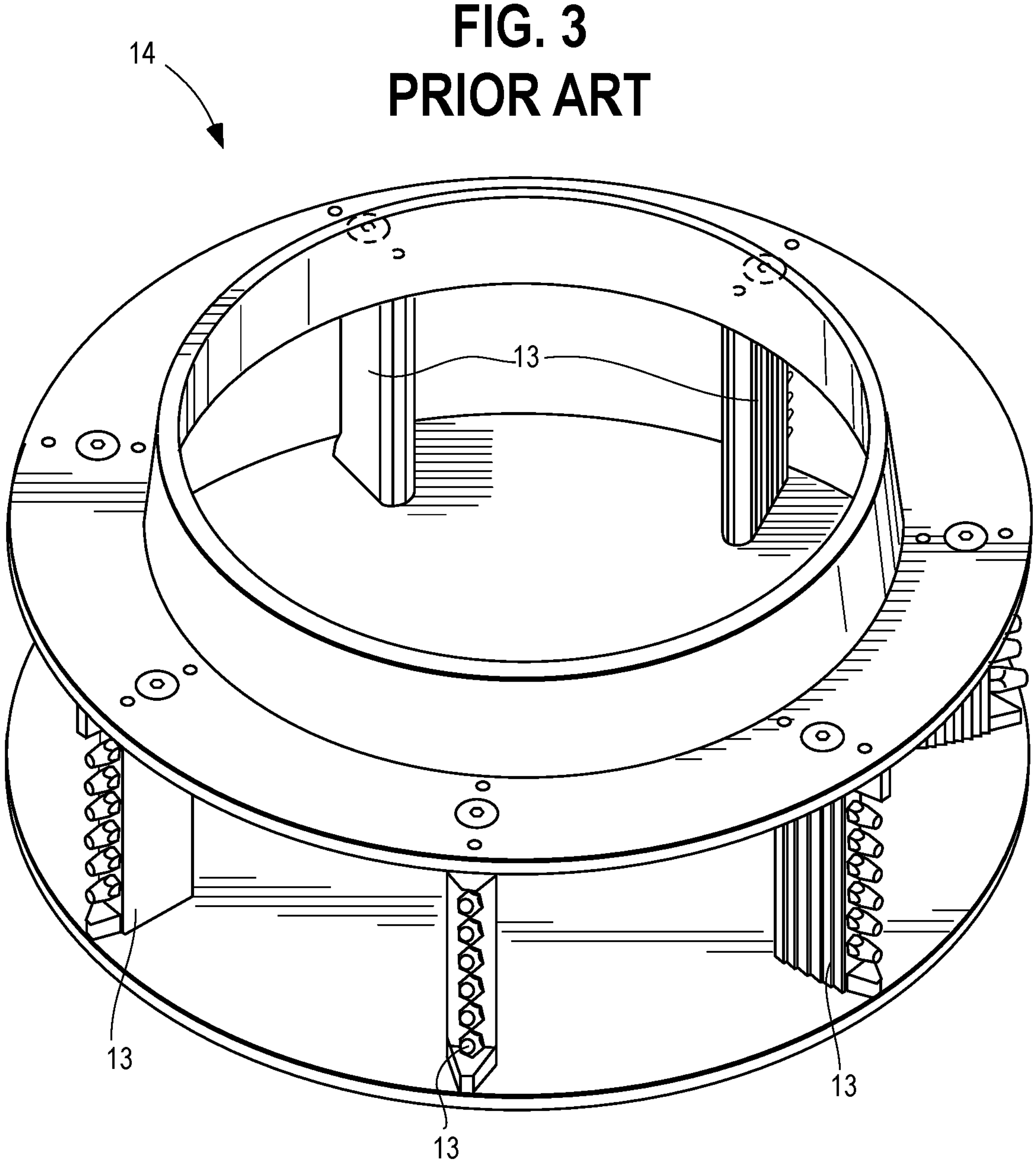
FIG. 3 PRIOR ART
FIG. 3 is a perspective view representing an impeller of a type that has found use in the slicing machine of FIG. 1 and the cutting head of FIG. 2.

FIGS. 5 through 12 schematically show non-limiting embodiments of impellers and components that are capable of use with a variety of cutting machines. The shown impellers and components may be used with any centrifugal-type slicing machine or cutting head. For example, the shown impellers and components may be used with the centrifugal-type slicing machine 10 depicted in FIG. 1 and the cutting head of FIG. 2, and, in some instances may be a replacement or a modification of an impeller for such machines and cutting heads. As a matter of convenience, non-limiting embodiments of the impeller and components invention will be illustrated and described with reference to the slicing machine 10 of FIG. 1 equipped with an annular-shaped cutting head 12 as described in reference to FIGS. 1 and 2. As such, the following discussion will focus primarily on certain aspects of the impeller and components that will be described in reference to the slicing machine 10 and cutting head 12, whereas other aspects not discussed in any detail below may be, in terms of structure, function, materials, etc., essentially as was described in reference to the impeller of FIGS. 1, 3, and 4. However, it will be appreciated that the following description of the impeller and components are also generally applicable to other types of cutting machines. Moreover, though such machines are particularly well suited for slicing food products, it is contemplated and one of skill will appreciate that the described impellers and components could be used in cutting machines that cut a wide variety of materials.

Figure 1:
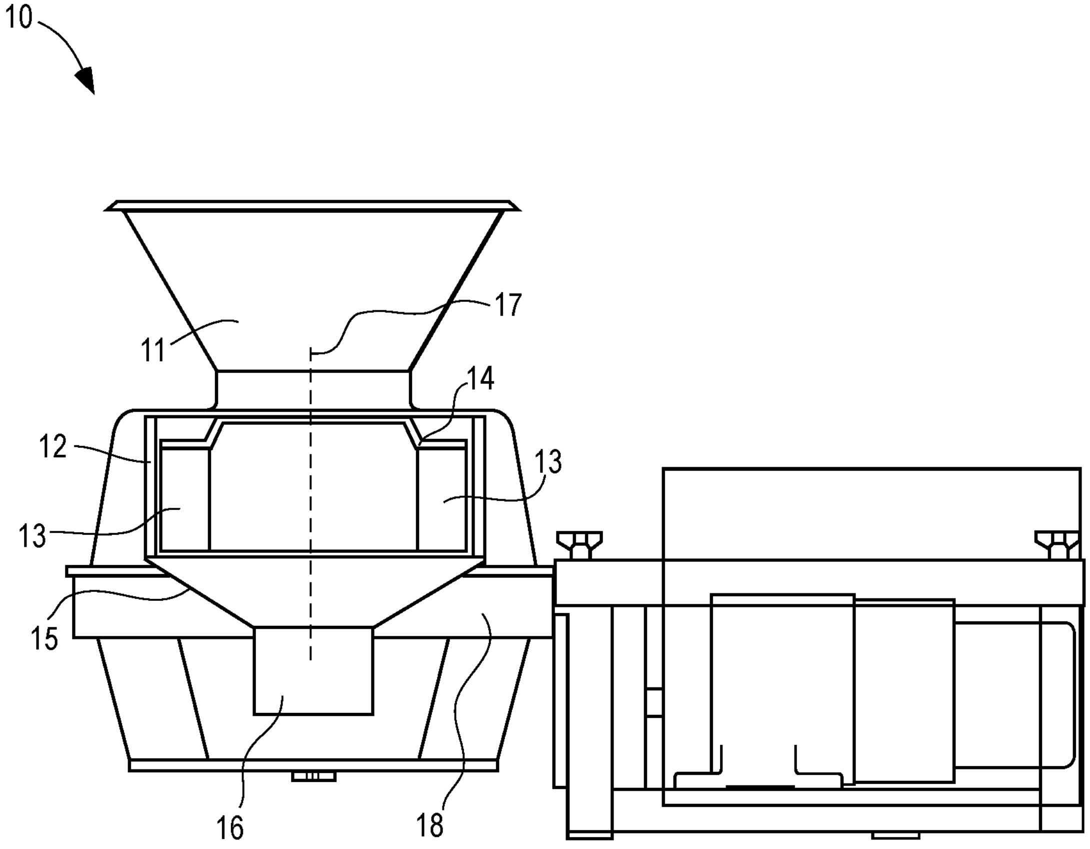
FIG. 1 PRIOR ART
FIG. 1 schematically represents a side view in partial cross-section of a centrifugal-type slicing machine known in the art.

To facilitate the description provided below of the embodiments represented in the drawings, relative terms may be used in reference to the orientation of an impeller within the cutting head 12, as represented by the impeller 14 in FIG. 1. On the basis of the coaxial arrangement of the cutting head 12 and impeller 14 of the machine 10 represented in FIG. 1, relative terms including but not limited to "axial," "circumferential," "radial," etc., and related forms thereof may also be used below to describe the non-limiting embodiments represented in the drawings. All such relative terms are useful to describe the illustrated embodiments but should not be otherwise interpreted as limiting the scope of the invention.

Figure 4:
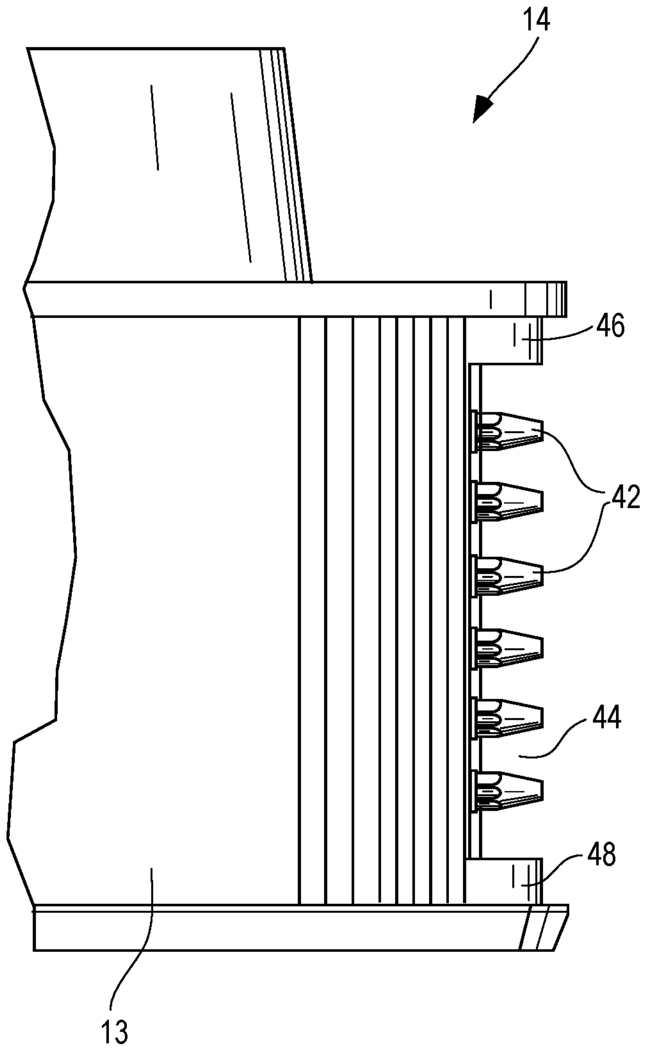
FIG. 4 PRIOR ART
FIG. 4 is a detailed side view of one embodiment of a paddle of the impeller of FIG. 3.
Figure 5:
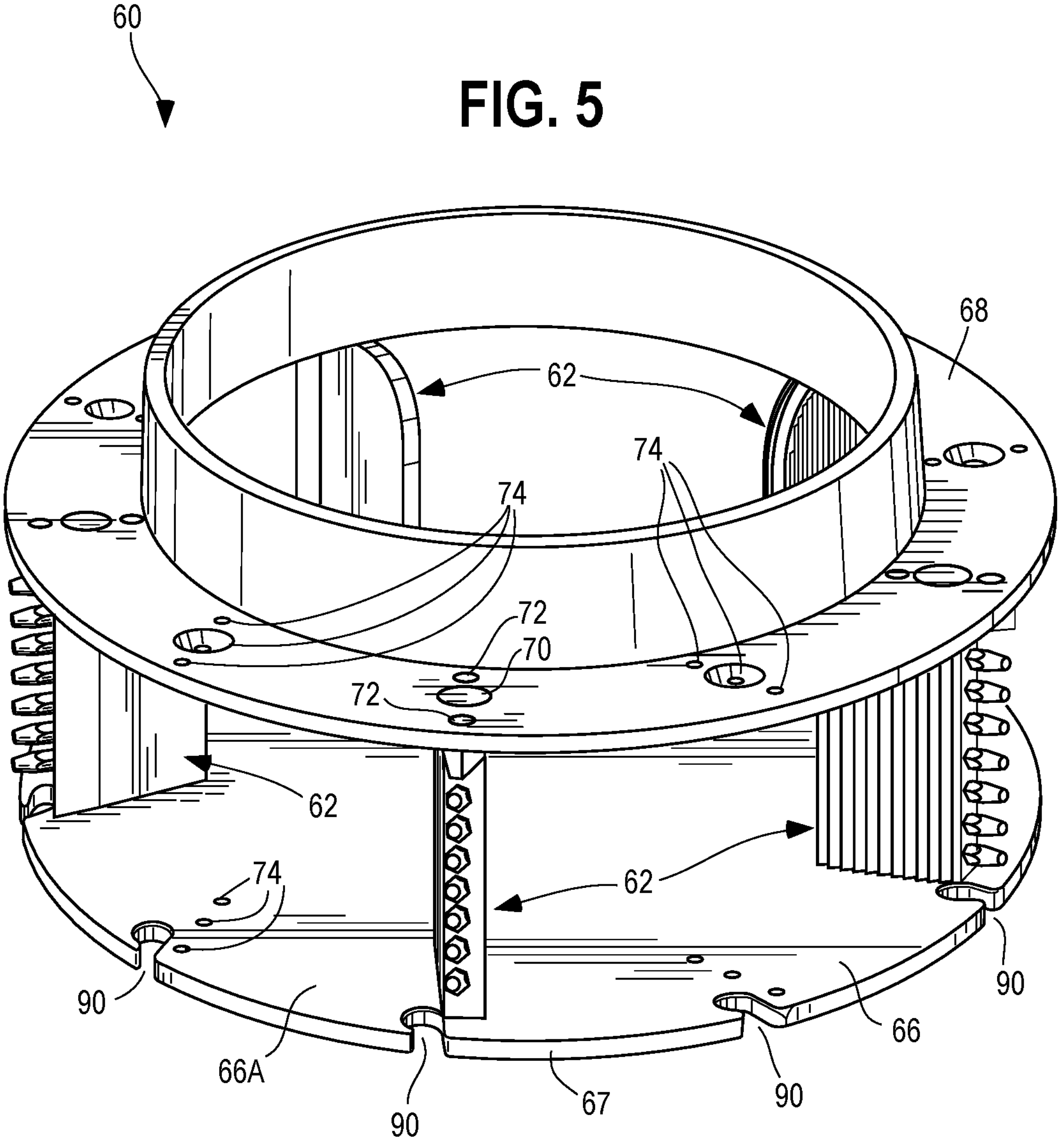
FIG. 5 is a perspective view of one embodiment of an impeller capable of use in a centrifugal-type slicing machine of the type represented in FIG. 1 and the cutting head of FIG. 2.
Figure 6:
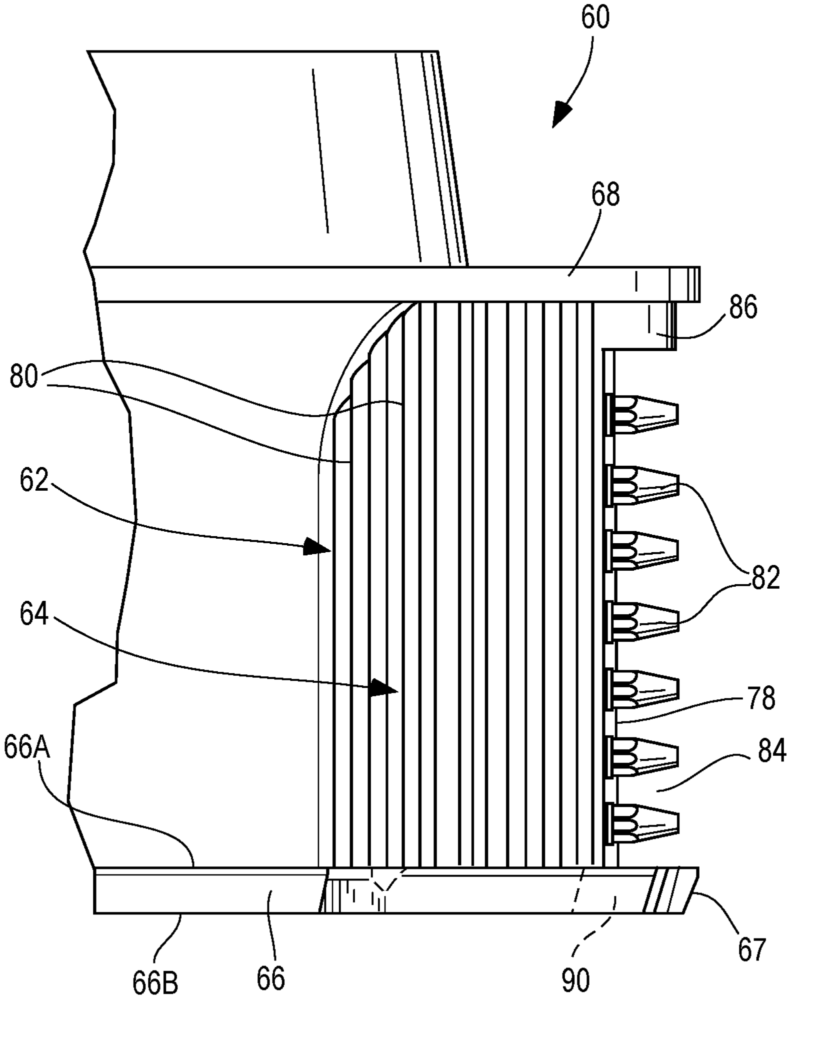
FIG. 6 is a detailed side view of one embodiment of a paddle that can be used with the impeller of FIG. 5.
Figure 7:
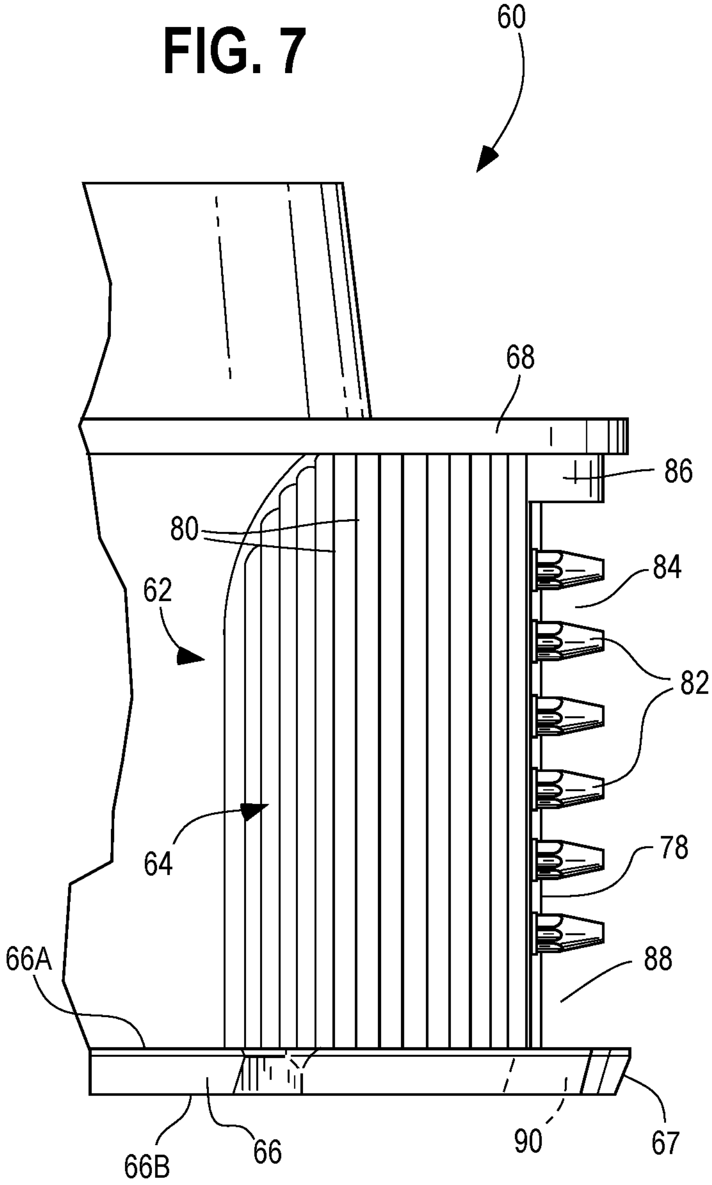
FIG. 7 is a detailed side view of another embodiment of a paddle that can be used with the impeller of FIG. 5.

Turning now to FIGS. 5, 6, and 7, an impeller 60 in accordance with a first non-limiting embodiment of the present invention is shown. Similar to the impeller 14 of FIGS. 1, 3, and 4, the impeller 60 has generally radially-oriented paddles 62 with faces 64 that engage and direct material radially outward against knives 20 of the cutting head 12 as the impeller 60 rotates about its axis of rotation. To that end, centrifugal forces created by the rotation of the impeller 60 cause a product that enters the impeller 60 to move radially outward, and once the product encounters a paddle 62 its radially outward movement is directed by the paddle 62 toward a knife 20 of the cutting head 12. The paddles 62 shown in the non-limiting embodiment of FIGS. 5, 6, and 7 may be coupled to the lower plate 66, the upper plate 68, or both. It will be appreciated that, although the paddles 62 are shown as being disposed between the lower plate and an annular-shaped upper plate 68, the upper plate is not necessary and thus, the paddles 62 will simply be attached to the lower plate 66.

The impeller 60 may be configured with individually formed paddles 62 arranged between a pair of annular-shaped plates 66 and 68. The impeller 40 and its components can be formed of any suitable material such as stainless steel or manganese-nickel-aluminum-bronze materials in addition to commonly-used MAB alloys and may be cast as integral components of the lower and/or upper plates 66 and 68. It is contemplated that the impeller and its components may be made in any suitable manner and formed with any suitable material that will function for its intended purpose.

In the non-limiting embodiments shown in FIGS. 5, 6, and 7, the paddles 62 may be individually mounted with bolts 70 and pins 72 to a corresponding set of mounting holes 74 provided (e.g., machined) in the plates 66 and 68, though it is also contemplated and understood that any of the paddles 62 could be directly attached to only one of the lower and upper plates 66 and 68 and indirectly attached to the other plate 66 or 68 as a result of the lower and upper plates 66 and 68 being coupled together, by for example, posts or connecting rods.

As shown in FIG. 5, additional sets of mounting holes 74 can be provided in the plates 66 and/or 68 to enable different numbers of paddles 62 to be mounted on the impeller 60. The placement (i.e., locations) of the mounting holes 74 determines the orientation or pitch of each paddle face 64 relative to a radial of the impeller 60 terminating at the outermost radial extent of the paddle face 64. The placement of the mounting holes 74 can be chosen so that the pitches of the paddle faces 64 are negative (the face 64 of each paddle 62 does not lie on a radial of the impeller 60 and the radially innermost extent of each paddle face 64 is angled away from the direction of rotation of the impeller 60 relative to a radial of the impeller 60), neutral (the face 64 of each paddle 62 lies on a radial of the impeller 60), or positive (the face 64 of each paddle 62 does not lie on a radial of the impeller 60 and the radially innermost extent of each paddle face 64 is angled toward the direction of rotation of the impeller 60 relative to a radial of the impeller 60).

FIG. 6 represents an individual paddle 62 and shows an outer radial extent 78 of the paddle 62 in proximity to the perimeter 67 of the lower plate 66. The skilled artisan will appreciate that the location of the individual paddles can vary greatly with respect to the perimeter 67 so long as the outer radial extent 78 does not contact the knife. As such, it is contemplated that the outer radial extent 78 may be located inside, equal to, or outside the perimeter 67 of the lower plate 66, depending on the location of the knife relative to the lower plate 66. In one non-limiting embodiment as shown in FIGS. 5, 6, and 7, the outer radial extent 78 of the paddles 62 is adjacent, but not contiguous with the perimeter 67, of the lower plate 66, such that a radial gap or distance exists between the outer radial extent 78 and the perimeter 67. The outer radial extent 78 of each paddle 62 may be generally straight and oriented in the axial direction of the impeller 60 (from top to bottom in FIG. 6). Suitable dimensions for the paddle 62 will depend in part on the size of the food products being processed, and can therefore vary considerably. As shown, the radially innermost extent of each paddle 62 may curve radially outward as it approaches the upper plate 68, though other shapes and profiles are possible, including straight.

FIGS. 5, 6, and 7 further depict the paddles 62 as having a generally linear or straight face 64, although it is contemplated that the face 64 may be curved (either concavely or convexly). Further, FIGS. 5, 6, and 7 show each paddle 62 as having the optional feature of axially oriented grooves 80, which may inhibit products from rotating while in contact with the paddles 62. To this end, it will be appreciated that the face 64 of the paddle may simply be flat, i.e., without grooves. Or, the face may have grooves provided in an orientation other than axially oriented.

The non-limiting embodiment of FIGS. 5, 6, and 7 also depicts the paddles 62 as being equipped with multiple posts 82 extending from and spaced along their outer radial extent 78, forming multiple gaps 84 through which foreign debris (which, as used in this description and claims, includes rocks and any other types of contaminants that may accompany and/or be imbedded in a material or product being cut) can pass without damaging the paddles 62 or the knives 20 and knife holders 30 of the cutting head 12. The posts 82 may be replaceable, for example, as a result of being threaded into the outer radial extent 78 of each paddle 62. The posts 82 may have a generally conical shape and may be angled so that a profile of its conical shape is coplanar with the face 64 of its paddle 62. As evident from FIGS. 5, 6, and 7, the uppermost extent of each paddle 62 is shown as lacking a post 82 but instead, each paddle 62 has an upper shear edge 86 (corresponding to the upper shear edge 46 of FIG. 4) that protrudes from the outer radial extent 78 of each paddle 62. It will be understood, however, that the upper shear edge 86 may be replaced with a post 82.

FIGS. 5, 6, and 7 also show that the lowermost extent of each paddle 62 is entirely defined by its outer radial extent 78 and lacks the lower shear edge 48 of FIG. 4. In the depicted but non-limiting configuration shown in FIGS. 5, 6, and 7 the upper shear edge 86 and the distal ends of the posts 82 define the outermost radial extent of the paddle 62. Further, FIG. 7 shows an embodiment where the lowermost extent of the paddle 62 also lacks a post 82, such that a larger gap 88 exists along the portion of the outer radial extent 78 below the lowest post 82 of the paddle 62. In addition, in the paddle 62 shown in FIG. 7, the upper shear edge 86 and the distal ends of the posts 82 define the outermost radial extent of the paddle 62, and the larger gap 88 defines a lower opening through which relatively large rocks and other foreign debris are able to pass in order to escape around the paddle 62 and its outer radial extent 78. As FIGS. 5, 6, and 7 represent a non-limiting embodiment, it should be understood that other configurations are possible, including the number and locations of the posts 82, the inclusion of a lower shear edge (e.g., corresponding to the lower shear edge 48 of FIG. 4), and the absence of any or all posts and/or shear edges. To that end, and as noted above, the paddles may be provided with an upper shear edge 86, a lower shear edge similar to lower shear edge 48 shown in FIG. 4, posts 82 or, may lack one, some, or all of these features.

FIGS. 5, 6, and 7 also show multiple exit slots 90 provided on the lower plate 66. The exit slots 90 may be located and spaced along the perimeter 67 of the lower plate 66 in proximity to the radially outermost extent 78 of each paddle 62 to create passageways through which rocks and other foreign debris 110 can pass to exit the impeller 60. It is believed that as rocks pass into an exit slot 90 they may contact the cutting head 12 at a lower surface of the shoe 26 and interior surface of the lower ring 22. Contact at these more robust surfaces, while undesirable, is less consequential than contact with the relatively more fragile knife 20 or knife holder 30 components. As such, the exit slots 90 provide the capability of avoiding or at least reducing the risk of damage to the paddles 62 of the impeller 60 and to the knives 20 and knife holders 30 of the cutting head 12.

Figure 11:
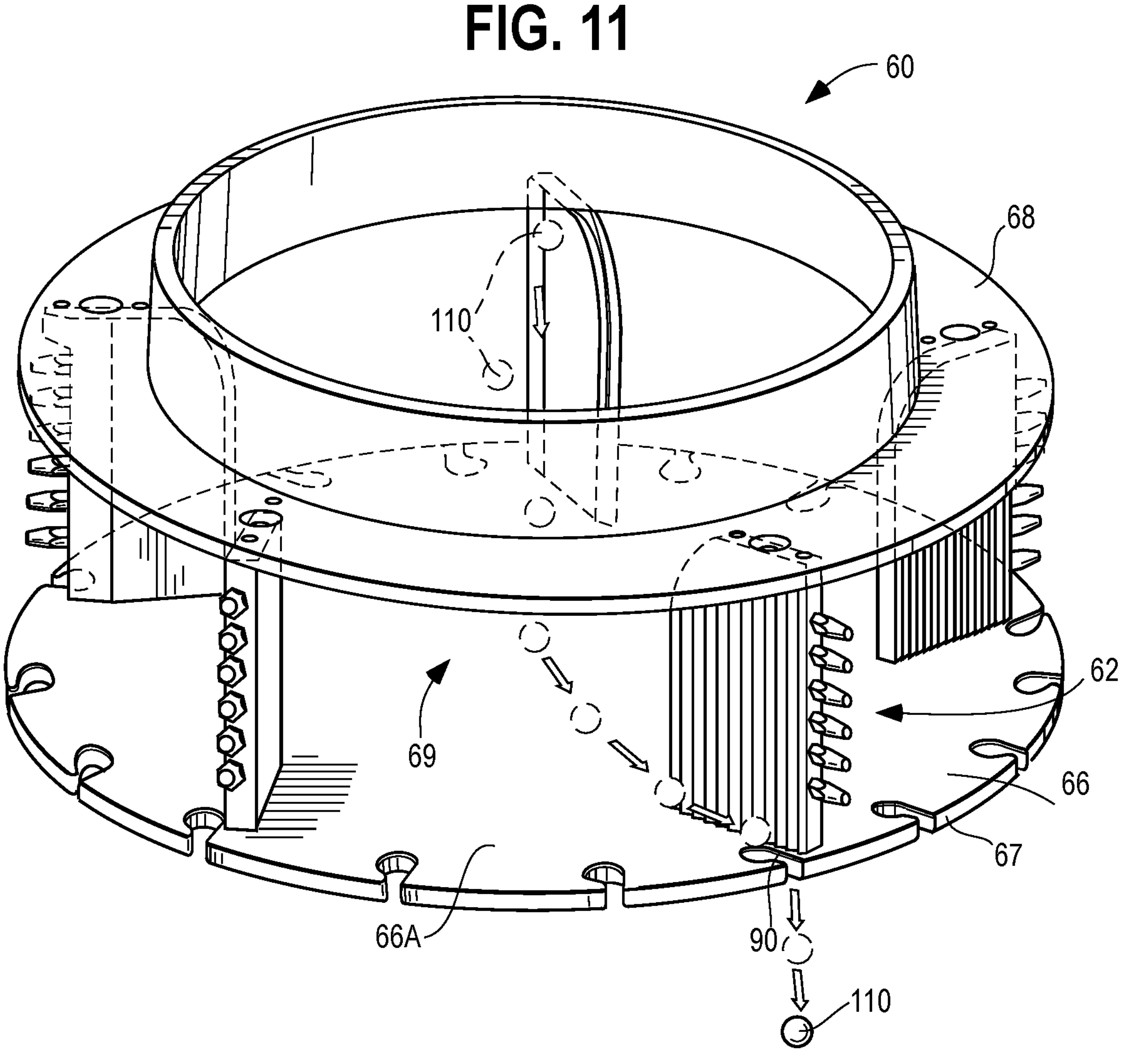
FIG. 11 is a perspective view of one embodiment of an impeller capable of use in a centrifugal-type slicing machine of the type represented in FIG. 1 and the cutting head of FIG. 2 that further shows a representation of a suggested trajectory of debris such as a rock within the impeller.

Without being bound by any particular theory, it is believed that foreign debris enters the cutting mechanism 10 in one of two ways. First, and as depicted in FIG. 11, the foreign debris 110 accompanies the food product and, as such, it drops or falls into the central area of the impeller along with the food product. Due to rotational forces, the foreign debris 110 is generally directed toward the cylindrical wall of the slicer where the foreign debris 110 can fall through one of the exit slots 90.

Figure 16:
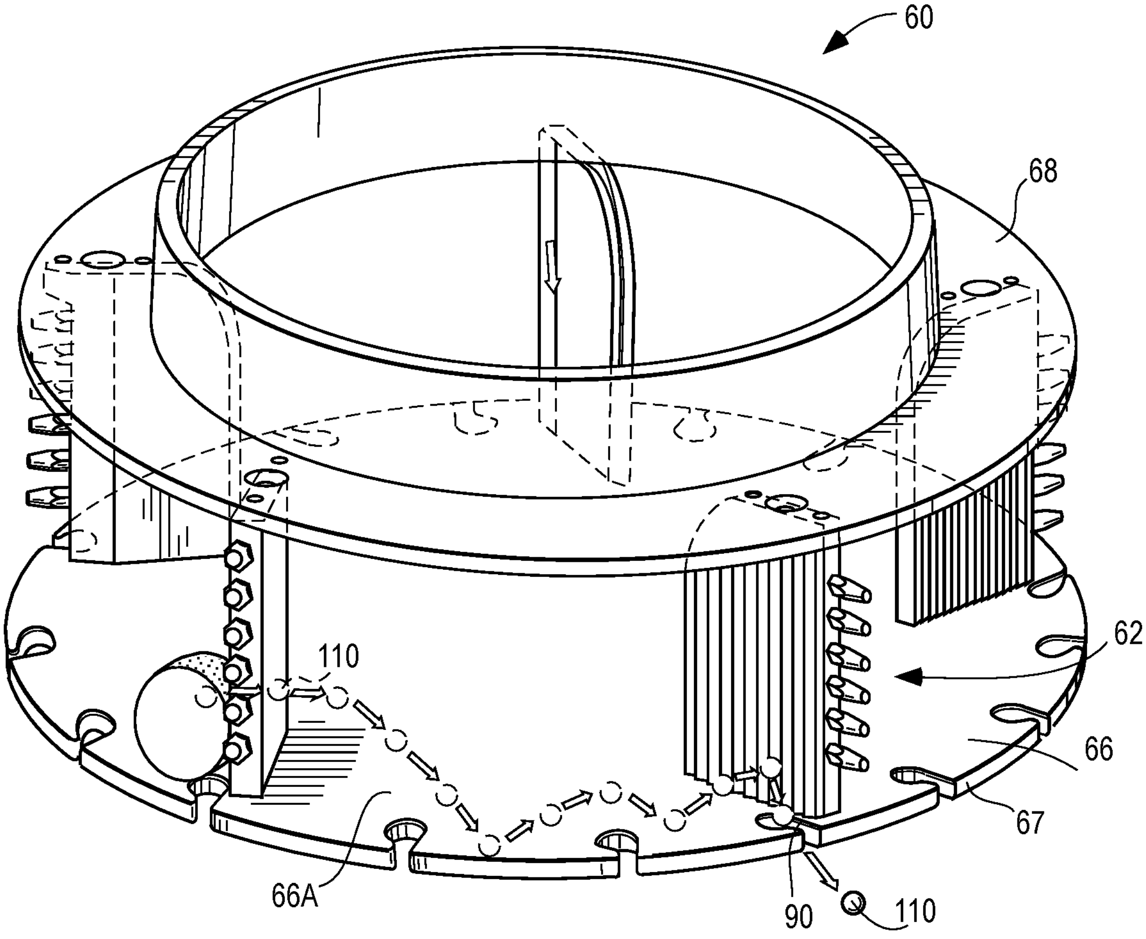
FIG. 16 is a perspective view of one embodiment of an impeller capable of use in a centrifugal-type slicing machine of the type represented in FIG. 5 and a cutting head such as that shown in FIG. 2 that further shows a representation of a suggested trajectory of foreign debris that has been liberated from a material that is being cut.

Second, and as depicted in FIG. 16, the foreign debris 110 may be imbedded within the food product. As the food product is being sliced, the foreign debris 110 is revealed and freed from the interior of the food product at which time it is able to drop to the lower plate 66 to meet the exit slot 90, which is rotating or moving in a direction toward the foreign debris 110. FIG. 16 shows one potential path of movement of the foreign debris 110 released from the food product. In this instance, the foreign debris 110 moves from the food product through a gap between two adjacent posts 82 of a paddle 62 where the foreign debris 110 contacts the top surface 66A of the lower plate 66, contacts the front face 64 of an adjacent paddle and then falls through an exit slot 90.

In each instance it is thought that the foreign debris 110 may bounce off one of more of the surfaces of the shoe 26, the lower plate 66, the paddle 62, and/or the paddle front face 64, and in some instances, the knife 20 and/or knife holder 30, before the foreign debris 110 passes through one of the exit slots 90 and is ejected from the cutting mechanism 10. One of skill will appreciate that the presence of the exit slots 90 will minimize the amount or degree of damage, particularly to the knife 20 and/or knife holder 30.

In FIGS. 5, 6, and 7 the exit slots 90 may be selectively located to accommodate various alternative locations of the paddles 62 enabled by their mounting holes 74, whether the paddles 62 are present or not. In the absence of such alternative locations, it is foreseeable that each exit hole 90 may be associated with a single paddle 62. In some instances, the exit slots 90 may be formed so that at least one exit slot 90 is entirely located to one side of each paddle 62 on which the face 64 is formed. In other instances, one or more of the exit slots 90 may be formed such that the face 64 of the paddle 62, or a portion of the face 64 of the paddle 62, overhangs the exit slot 90. It will also be appreciated that the exit slots 90 intersect the perimeter 67 of the lower plate 66, and extend radially inward.

In general, the exit slots 90 have a structural configuration such that the exit slot 90, or a portion of the exit slot 90 intersects the perimeter 67 of the lower plate 66. In that regard, the specific structural configuration of the exit slot 90 itself or in conjunction with the structural configuration of the shoe 26 is such to encourage the foreign debris 100 to encounter and pass through an exit slot 90 before damaging the knife 20 and/or the knife holder 30. As one example, the exit slot 90 may be chamfered, i.e., configured with a shape that tapers outwardly from the top surface 66A to the bottom surface 66B of the lower plate 66.

Figure 8:
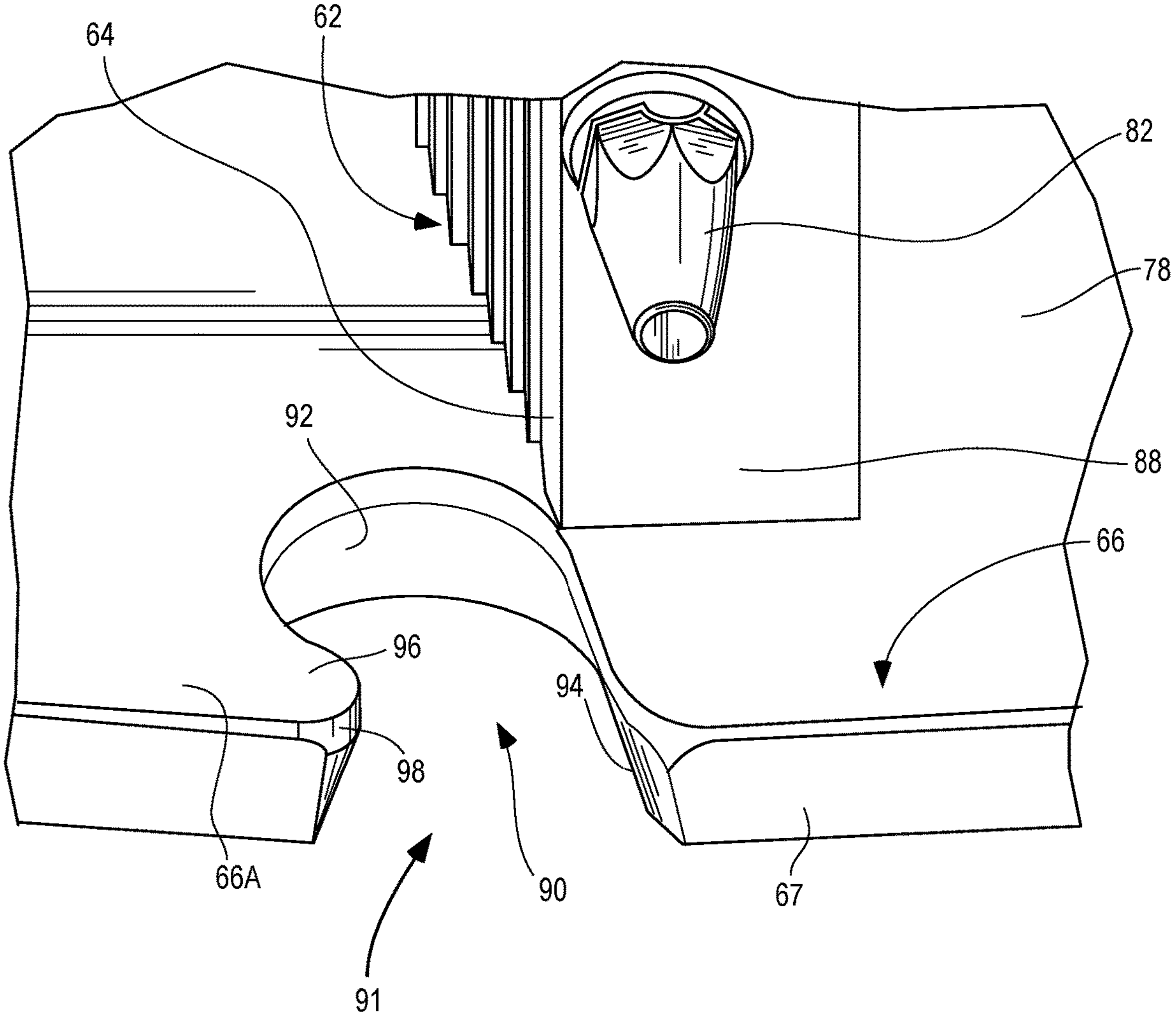
FIG. 8 is a detailed view of one embodiment of an exit slot.
Figure 17:
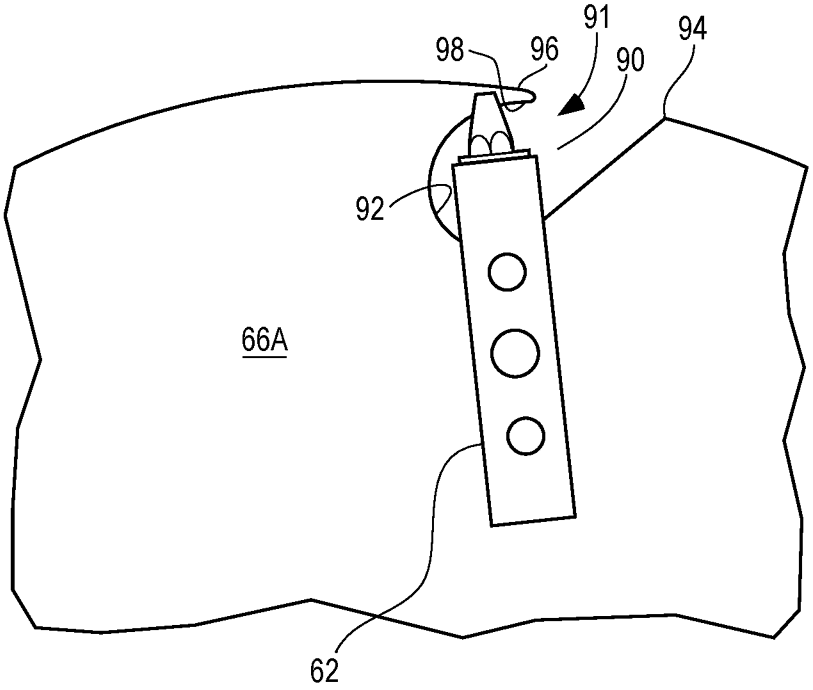
FIG. 17 is a top view of one configuration of a paddle and exit slot.

Turning now to FIG. 8, a detail view of one embodiment of an exit slot 90 is shown. The exit slot 90 includes a wall 94 adjacent the perimeter 67 of the lower plate that joins with an arcuate radially innermost wall 92 that terminates near the perimeter 67 of the lower plate 66 to define what may be described as a "hook" 96 that defines a protrusion 98 (which in this instance is rounded) that projects toward the wall 94, creating what may be described as a neck 91 of the slot 90 between the rounded protrusion 98 and the wall 94. The hook 96 and its protrusion 98 may help capture foreign debris 110 to reduce the risk that such foreign debris 110 may become wedged between the impeller 60 and a knife 20 or knife holder 30 of the cutting head 12. A similar exit slot 90 structure is depicted in FIG. 17.

It is also believed that the trajectory of the foreign debris 110 will cause the foreign debris 110 to encounter the exit slot 90 passing through the neck between the wall 94 and protrusion 98, or contacting the protrusion 98 before being deflected downward through the slot 90. As such, the edge condition of the slot 90 defined by the walls 92 and 94, in particular, their angle relative to the upper surface 66A of the lower plate 66, may be tailored to promote the foreign debris 110 dropping down through the slot 90 if the rock were to impact the walls 92 and 94 or the protrusion 98, instead of bouncing out of the slot 90. Optimal angles for the walls 92 and 94 foreseeably depend on the size and shape of the slot 90, the size and mass of the foreign debris 110, and rotational speed of the impeller 60.

In some embodiments, the arcuate wall 92 may have a radius of about 0.25 inch (about 0.6 cm) and the circumferential distance between the wall 94 and protrusion 98, i.e., the neck of the slot 90, may be about 0.375 inch (about 1 cm). In the embodiment shown in FIG. 8, the walls 92 and 94 of each slot 90 are inclined so that the lower exit of the slot 90 at the lower surface 66B of the lower plate 66 is larger than the upper entrance of the slot 90 at the upper surface 66A of the lower plate 66 to promote egress of foreign debris 100 from the impeller 60 through the slot 90.

Examining FIG. 8, it may be appreciated that the walls 92 and 94 and the protrusion 98 of the depicted slot 90 are defined by multiple wall surface regions having different orientations relative to each other. The particular shape of the slot 90 represented in FIG. 8 can be produced by a multi-step machining process to size, shape, and orient the exit slots 90 and their walls 92 and 94 to promote exiting of foreign debris through the exit slots 90.

Because the exit slots 90 serve a different function from the mounting holes 74 they differ from the mounting holes 74 in terms of their size, shape, and/or locations on the lower plate 66 of the impeller 60. For example and as shown in FIG. 5, the exit slots 90 pass through the lower plate 66 between upper and lower surfaces 66A and 66B of the plate 66 and intersect the perimeter 67 of the lower plate 66; whereas the mounting holes 74 do not intersect the perimeter.

Figure 9:
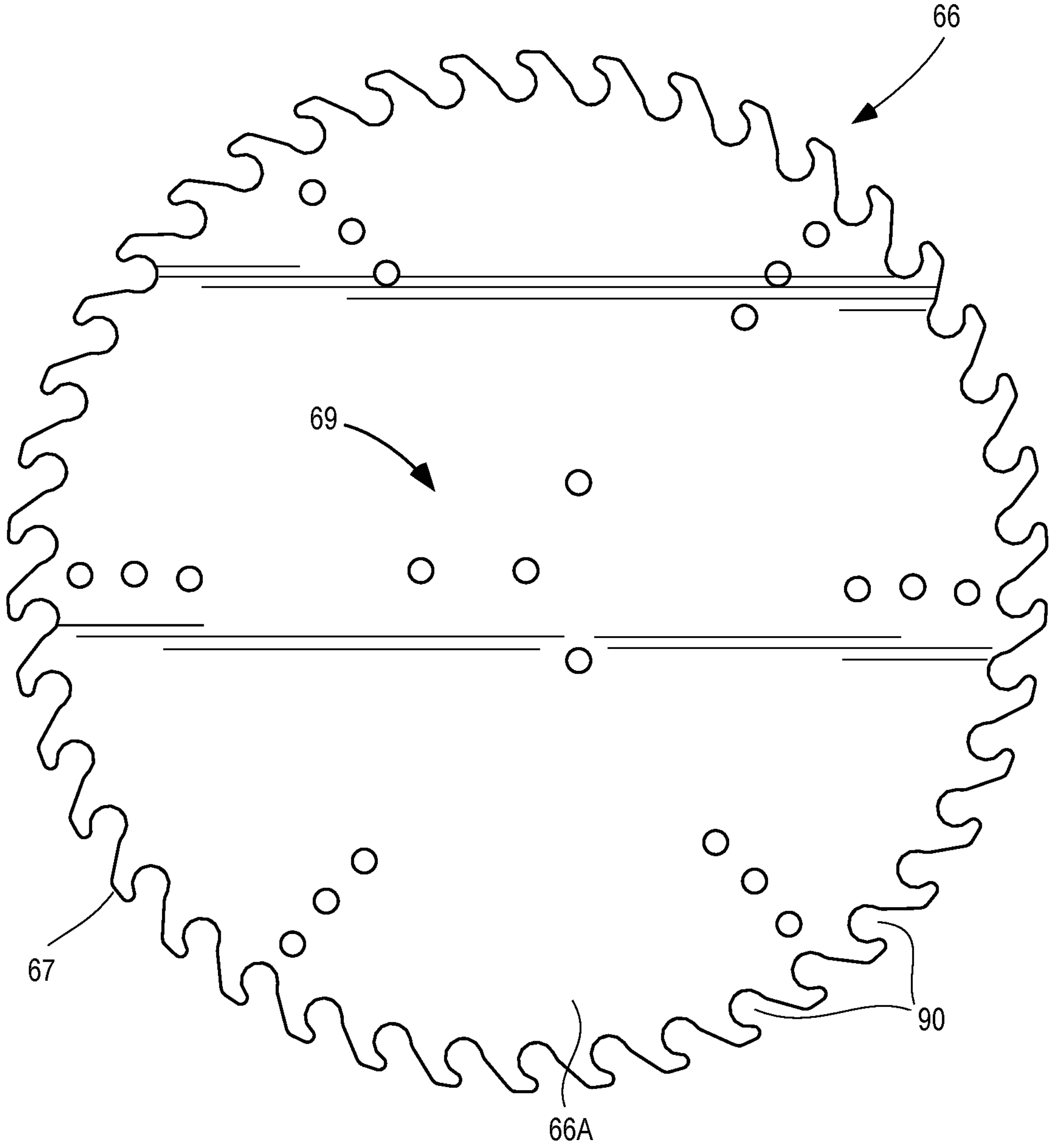
FIG. 9 is a plan view that shows a configuration of exit slots provided on a lower plate for an impeller capable of use in a centrifugal-type slicing machine of the type represented in FIG. 1 with the cutting head shown in FIG. 2.
Figure 10:
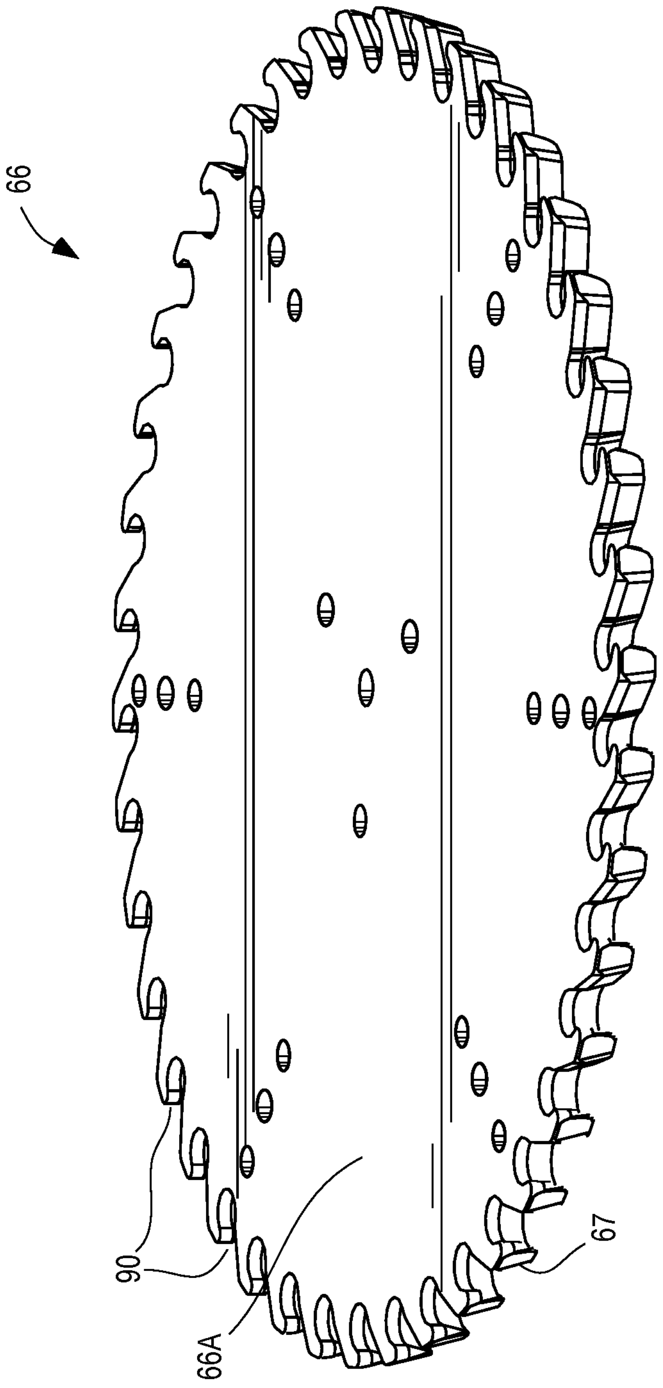
FIG. 10 is a perspective view of the lower plate shown in FIG. 9.

Various shapes and sizes are foreseeable for the exit slots 90. For example, the exit slots 90 may have an oblong shape with its major dimension oriented in a radial direction of the lower plate 66. Alternatively, FIGS. 9 and 10 schematically show a configuration for the lower plate 66 of the impeller 60 with exit slots 90. The lower plate 66 of FIGS. 9 and 10 differ from, for example the lower plate 66 shown in FIG. 5, as a result of being fabricated to have exit slots 90 that are equally circumferentially spaced along the entire perimeter 67. Other than being equally spaced instead of selectively located, the exit slots 90 can be similarly sized and shaped as the exit slots 90 shown in the other figures. Other aspects of the embodiment of FIGS. 9 and 10 can be, in terms of structure, function, materials, etc., essentially as was described for the embodiment of FIGS. 5 through 8.

Figure 15:
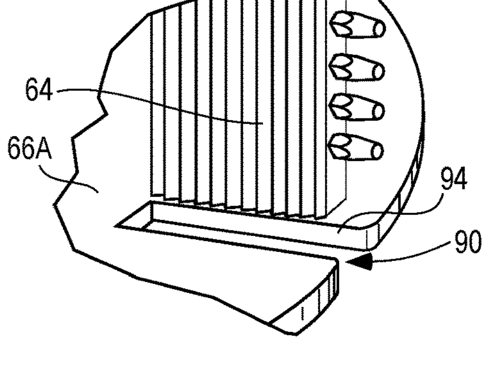
FIG. 15 is a detailed perspective view of a paddle in cooperation with one embodiment of an exit slot.

Another example of a configuration of an exit slot 90 in conjunction with a paddle 62 is shown in FIG. 15. In this arrangement, the exit slot 90 is in the shape of a rectangle with its major dimension or long side oriented in a radial direction of the lower plate 66. In this particular view, the exit slot is located adjacent the front face 64 of the paddle 62 with its long side oriented parallel to the front face 64 of the paddle 62 and with a portion of the top surface 66A of the lower plate located between the front face 64 and the edge of the exit slot 90. As noted above, the edge of the exit slot may be contiguous with the front face 64 of the paddle 62. Alternatively, the front face 64 or a portion of the front face 64 of the paddle 62 may overhang a portion of the exit slot. In addition, as depicted in FIG. 15, the major dimension of long side of the exit slot extends from the perimeter 67 to the radially inward-most portion of the paddle, i.e., the exit slot 90 extends the entire length of the front face 64 of the paddle. It is contemplated that the exit slot extends only a portion of the length of the front face 64 of the paddle.

The width of such an exit slot 90 shown in FIG. 15, or a similarly shaped exit slot, should be such that foreign debris 110 can pass through the exit slot 90 but that the material that is being sliced (e.g., the potato that is being sliced into pieces) does not pass through the exit slot 90. Accordingly, it is desirable to provide an exit slot 90 width or opening that is about less than one half of the size of the material being sliced. In some instances, the exit slot 90 width is about 0.5 inch to about 0.625 inch.

While the shape of the exit slots 90 and their location on the lower plate 66 with respect to the paddles 66 will aid in providing a suitable egress for foreign debris 110, it will be appreciated that the shape of the walls defining the exit slots 90 may also help to direct the foreign debris 110 away from the knife 20 and knife holder 30 and to retain or encourage movement of the foreign debris 110 through the exit slot 90. To that end and as explained above with respect to FIG. 8, the walls may be chamfered, tapered outwardly, or have multiple wall surface regions having different orientations relative to each other. In some embodiments, one or both of the walls 92 and 94 of the exit slots 90 may be orthogonal or perpendicular to the upper surface 66A of the plate 66 as depicted in, for example, FIGS. 14 and 15.

Turning to FIG. 11, a proposed exemplary trajectory of foreign debris (e.g., a rock) 110 is shown. It will be seen that the foreign debris 110 vertically enters the impeller 60 of FIGS. 5 through 7 along its axis of rotation toward a central zone 69 of the upper surface 66A of the lower plate, travels across the upper surface 66A of the lower plate 66 under the influence of centrifugal forces generated by the rotation of the impeller 60, and then through one of the exit slots 90 in the lower plate 66. It will be appreciated that the depicted travel of the foreign debris 110 shown in FIG. 11 is merely representative and that the foreign debris 110 may contact the upper surface 66A at different locations, more or less than shown, may contact the paddle 62, knife 20, shoe 26, holder 30, etc. before exiting through the exit slot 90.

Figure 12:
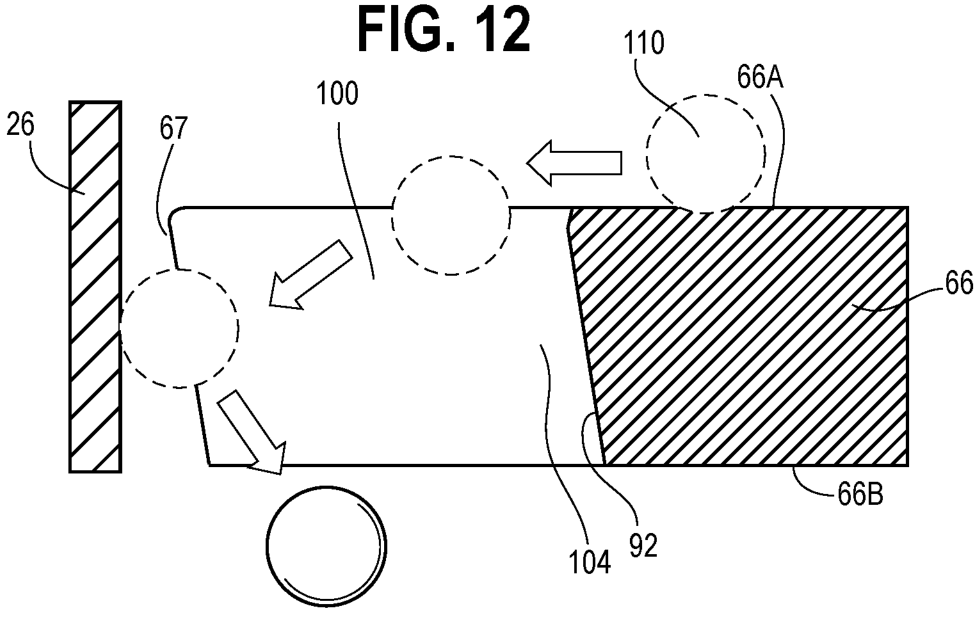
FIG. 12 is a sectional view of a detail of one embodiment of a lower plate of an impeller in cooperation with a portion of a cutting head that shows a proposed trajectory of debris in connection with a wall of a holder of the cutting head of, for example, FIG. 2.
Figure 13:
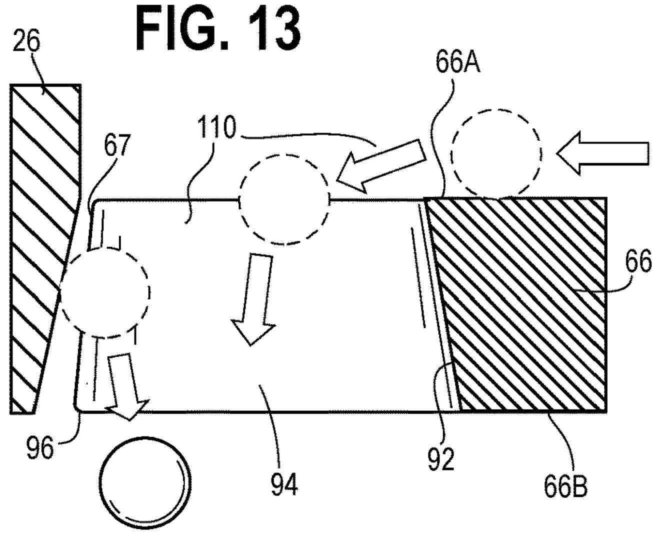
FIG. 13 is a sectional view of a detail of one embodiment of a lower plate of an impeller in cooperation with a portion of a cutting head that shows a proposed trajectory of debris in connection with another embodiment of a wall of a holder of the cutting head of, for example, FIG. 2.
Figure 14:
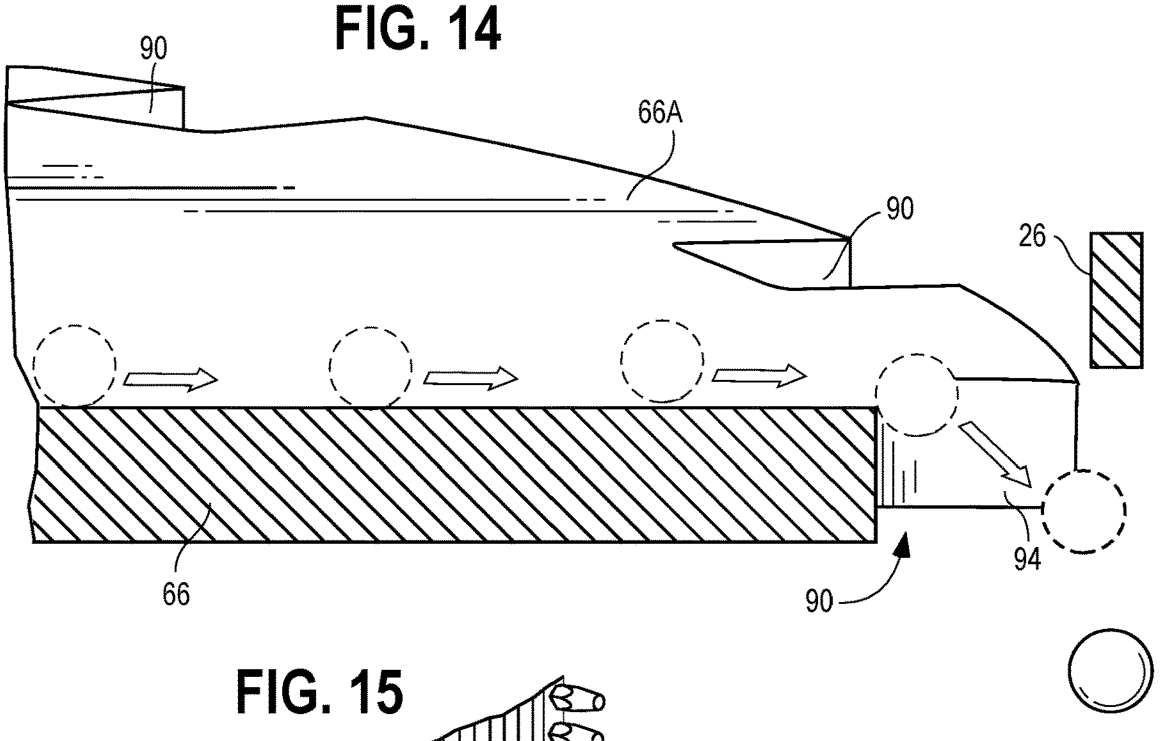
FIG. 14 is a sectional view of a detail of one embodiment of a lower plate of an impeller in cooperation with a portion of a cutting head that shows a proposed trajectory of debris in connection with another embodiment of a wall of a holder of the cutting head of, for example, FIG. 2.

It is also contemplated that in addition to the configuration of the exit slots 90 and their location relative to the paddles, that the configuration of the wall or shoe 26, or lower support ring 22 of the cutting head 12 can be configured to encourage foreign debris 110 to exit. In that regard, FIGS. 12, 13, and 14 show alternative structures of the shoe 26 in connection with an anticipated direction of movement of foreign debris 110 through the exit slot 90. In particular, FIG. 12 shows the lower end of the shoe 26 extending from above the top surface 66A of the lower plate 66 to at least the bottom surface 66B.

FIG. 13 shows that the lower end of the shoe 26 is tapered or chamfered to provide an angled surface that if the foreign debris contacts the angled surface the foreign debris will be directed downward through the exit slot 90. FIG. 14 shows that the lower end of the shoe 26 is at or slightly above the top surface 66A of the lower plate to provide a larger egress path for the foreign debris 110.

Turning now to FIG. 17, another example of a configuration of an exit slot 90 associated with a paddle 62 is shown. In this embodiment, the exit slot 90 includes a wall 94 adjacent the perimeter 67 of the lower plate that joins with an arcuate radially innermost wall 92 that terminates near the perimeter 67 of the lower plate 66 to define what may be described as a “hook” 96 that defines a protrusion 98 that projects toward the wall 94, creating what may be described as a neck 91 of the slot 90 between the protrusion 98 and the wall 94. The hook 96 and its protrusion 98 may help capture foreign debris 110 to reduce the risk that such foreign debris 110 may become wedged between the impeller 60 and a knife 20 or knife holder 30 of the cutting head 12.

Similar to the configuration of the exit slot 90 shown in FIG. 8, the configuration of the exit slot 90 shown in FIG. 17 will, in view of the direction of rotation (clockwise in both FIGS. 8 and 17), the neck 91 may act like a scoop to "pull" debris radially inward away from the shoe 26, lower support ring 22, etc. into the cavity of the slot 90 that is generally located beneath the paddle 62.

Figure 18:
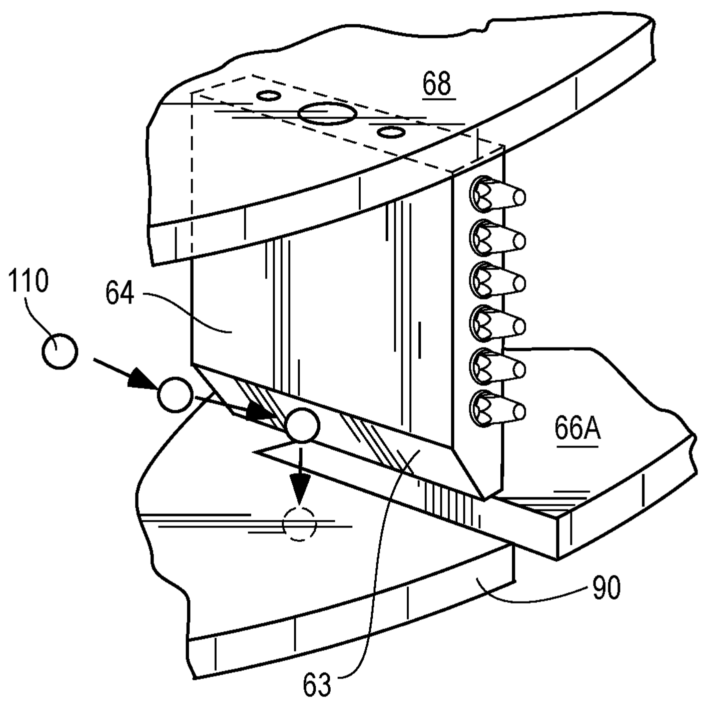
FIG. 18 is a perspective view of one embodiment of a paddle associated with an exit slot and depicting one structural configuration of the lower portion of the paddle.
Figure 19:
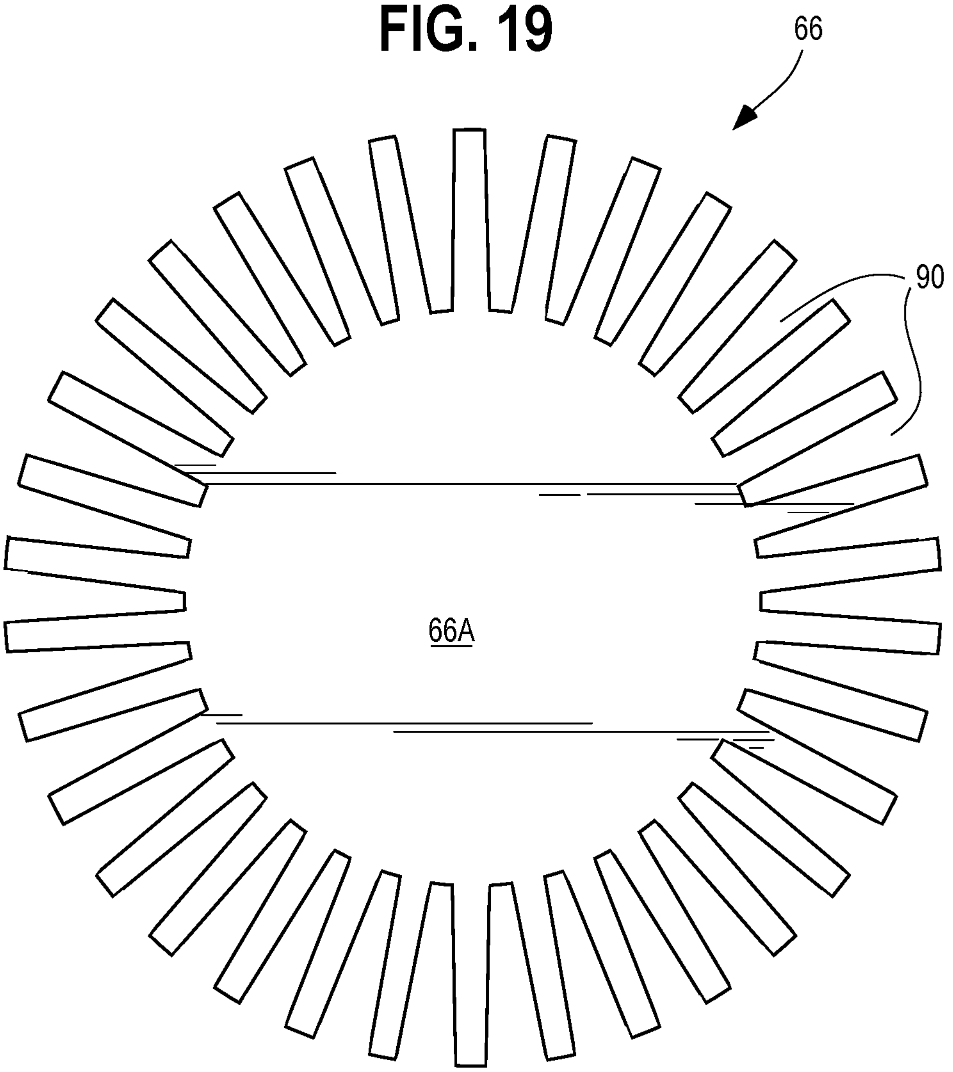
FIG. 19 is

It is also contemplated that the bottom portion 63 of the paddle 62, i.e., the portion of the paddle 62 that is adjacent the top surface 66A of the lower plate 66 may be shaped to encourage movement of foreign debris 110 into the exit slot 90. As one example of such, FIG. 18 shows a paddle 62 where the bottom portion 63 is tapered or angled in a manner to direct foreign debris 110 encountering the bottom portion 63 toward and through the exit slot 90. In some instances the bottom portion 63 is tapered at an obtuse angle with respect to the lower plate 66.

While the invention has been described in terms of specific or particular embodiments, it should be apparent that alternatives could be adopted by one skilled in the art. For example, the machine 10, cutting head 12, impeller 60, and their respective components could differ in appearance and construction from the embodiments described herein and shown in the drawings, functions of certain components of the machine 10, cutting head 12, and/or impeller 60 could be performed by components of different construction but capable of a similar (though not necessarily equivalent) function, and various materials could be used in their fabrication. In addition, the invention encompasses additional or alternative embodiments in which one or more features or aspects of a particular embodiment could be eliminated or two or more features or aspects of different disclosed embodiments could be combined. Accordingly, it should be understood that the invention is not necessarily limited to any embodiment described herein or illustrated in the drawings. It should also be understood that the purpose of the above detailed description and the phraseology and terminology employed therein is to describe the illustrated embodiments, and not necessarily to serve as limitations to the scope of the invention. Finally, while the appended claims recite certain aspects believed to be associated with the invention, they do not necessarily serve as limitations to the scope of the invention.

The invention claimed is:

1. An impeller adapted to be coaxially mounted within a cutting head for rotation about an axis of the cutting head, the impeller comprising:

a lower plate having an upper surface, a lower surface, a central zone, and a perimeter;

at least a first exit slot located in the lower plate, intersecting the perimeter of the lower plate, and extending through the lower plate to define a passageway to enable foreign debris at the upper surface to exit the impeller through the passageway, wherein the at least first exit slot is defined by a protrusion that projects toward an opposing wall to define a neck that is open to the perimeter, and an arcuate wall located radially inward from the perimeter of the lower plate and joining the protrusion to the opposing wall, and wherein a portion of the opposing wall tapers outwardly from the upper surface to the lower surface of the lower plate; and, at least one paddle located adjacent the opposing wall, opposed to the protrusion, and configured with the lower plate outside of the central zone.

2. The impeller according to claim 1, wherein the at least first exit slot has a major dimension oriented in a radial direction of the impeller.

3. The impeller according to claim 1 wherein an opening on the upper surface defined by the opposing wall has a size that is smaller than an opening on the lower surface defined by the opposing wall.

4. The impeller according to claim 1 wherein the at least one paddle is adjacent the first exit slot.

5. The impeller of claim 4 wherein the at least one paddle has a lower portion that is adjacent to the upper surface of the lower plate with the lower portion being oriented at an obtuse angle with respect to the upper surface of the lower plate.

6. The impeller according to claim 1 wherein at least a portion of the at least one paddle overhangs at least a portion of the first exit slot.

7. The impeller according to claim 1 wherein the at least a first exit slot includes a plurality of slots provided about the periphery of the lower plate, wherein at least one of the plurality of slots intersects the perimeter of the lower plate.

8. The impeller according to claim 1 wherein a perimeter of the protrusion, arcuate wall, and opposing wall on the upper surface of the lower plate is smaller than a perimeter of the protrusion, arcuate wall, and opposing wall on the lower surface of the lower plate.

9. A cutting machine comprising an annular-shaped cutting head and an impeller coaxially mounted within the cutting head for rotation about an axis of the cutting head in a rotational direction relative to the cutting head, the cutting head having multiple knives each extending radially inward toward the impeller in a direction opposite the rotational direction of the impeller, the impeller comprising:

a lower plate having an upper surface, a lower surface, and a perimeter;

at least a first exit slot located in the lower plate, intersecting the perimeter of the lower plate, and extending through the lower plate to define a passageway to enable foreign debris at the upper surface to pass through the passageway, wherein the at least first exit slot is defined by a protrusion that projects toward an opposing wall to define a neck that is open to the perimeter, an arcuate wall located radially inward from the perimeter of the lower plate and joining the protrusion to the opposing wall, and wherein a portion of the wall tapers outwardly from the upper surface to the lower surface of the lower plate; and at least one paddle located adjacent the wall, opposed to the protrusion, and configured with the lower plate to direct material on the lower plate in a radially outward direction of the impeller when the impeller is rotated, at least one of the paddles having an outer radial extent that is adjacent the perimeter of the lower plate.

10. The cutting machine according to claim 9, wherein the at least first exit slot has a major dimension oriented in a radial direction of the impeller.

11. The cutting machine according to claim 9, wherein the wall spaced is adjacent the perimeter and joins with an arcuate radially innermost wall that terminates near the perimeter to define the protrusion.

12. The cutting machine according to claim 9 wherein an opening on the upper surface defined by the wall has a size that is smaller than an opening on the lower surface defined by the wall.

13. The cutting machine according to claim 9 wherein the at least one paddle is adjacent the first exit slot.

14. The cutting machine of claim 13 wherein the at least one paddle has a lower portion that is adjacent to the upper surface of the lower plate with the lower portion being oriented at an obtuse angle with respect to the upper surface of the lower plate.

15. The cutting machine according to claim 9 wherein at least a portion of the at least one paddle overhangs at least a portion of the first exit slot.

16. The cutting machine according to claim 9 wherein the at least a first exit slot includes a plurality of slots provided about the periphery of the lower plate, wherein at least one of the plurality of slots intersects the perimeter of the lower plate.

17. The cutting machine according to claim 9 wherein at least one of the multiple knives are carried by a respective shoe provided on the cutting head, with at least one of the respective shoes being adjacent the first exit slot and having a lower portion.

18. The cutting machine according to claim 17 wherein the lower portion of the at least one of the respective shoes does not extend below the upper surface of the lower plate.

19. The cutting machine according to claim 17 wherein the lower portion of the at least one of the respective shoes extends below the upper surface of the lower plate.

20. The cutting machine according to claim 19 wherein the lower portion of the at least one of the respective shoes is tapered away from the upper surface of the lower plate.

* * * * *